United States Patent
Shin et al.

[11] Patent Number: 5,668,626
[45] Date of Patent: Sep. 16, 1997

[54] DISTANCE MEASURING APPARATUS

[75] Inventors: Ryutaro Shin; Ryoichi Suzuki, both of Yokohama, Japan

[73] Assignee: Canon Kabushiki Kaisha, Tokyo, Japan

[21] Appl. No.: 490,717

[22] Filed: Jun. 15, 1995

[30] Foreign Application Priority Data

Jun. 17, 1994 [JP] Japan .................. 6-135682
Sep. 14, 1994 [JP] Japan .................. 6-244961

[51] Int. Cl.$^6$ .................. G01C 3/00; G03D 9/00
[52] U.S. Cl. .................. 356/3.08; 396/582
[58] Field of Search .................. 356/3.03, 3.04, 356/3.08; 354/303

[56] References Cited

U.S. PATENT DOCUMENTS

| | | | |
|---|---|---|---|
| 4,814,810 | 3/1989 | Ishiguro | 354/403 |
| 5,221,955 | 6/1993 | Inoue | 356/1 |
| 5,274,429 | 12/1993 | Misawa et al. | 356/1 |
| 5,319,414 | 6/1994 | Nakano et al. | 354/403 |
| 5,493,362 | 2/1996 | Nonaka | 354/403 |
| 5,512,997 | 4/1996 | Ogawa | 356/3.04 |

*Primary Examiner*—Mark Hellner
*Attorney, Agent, or Firm*—Robin, Blecker, Daley & Driscoll

[57] ABSTRACT

A distance measuring apparatus includes: a light projecting unit including a light source and a light projecting lens; a distance measuring first photosensor unit disposed at a predetermined baseline length from the light projecting unit and including a first photosensor and a first light receiving lens; and a second photosensor unit disposed in the vicinity of the light projecting unit in a direction perpendicular to the baseline and including a second photosensor and a second light receiving lens. An output of the second photosensor unit is used for correcting an output of the first photosensor unit.

11 Claims, 6 Drawing Sheets

DISTANCE MEASURING APPARATUS

BACKGROUND OF THE INVENTION

1. Field of the Invention

The present invention relates to an active-type distance measuring apparatus capable of avoiding erroneous measurement even in a case where the projected light does not properly project on an object or in a case where the object has a distribution of the optical reflectance.

2. Related Background Art

For auto focusing apparatus for an active-type camera, there have been proposed various devices based on the trigonometric principle, and, for avoiding erroneous measurement encountered in such active-type auto focusing apparatus by eclipse of the projected light or by the contrast in an object, the Japanese Patent Laid-open Application No. 63-235909 discloses an apparatus provided with plural position detecting optical systems, receiving the reflection light from the object with plural photo sensor units and performing the position detection by averaging the detected positions of the received light in such plural positions, thereby improving accuracy of measurement. A modification of such conventional apparatus will be explained in the following with reference to FIG. 8.

Figure 8:
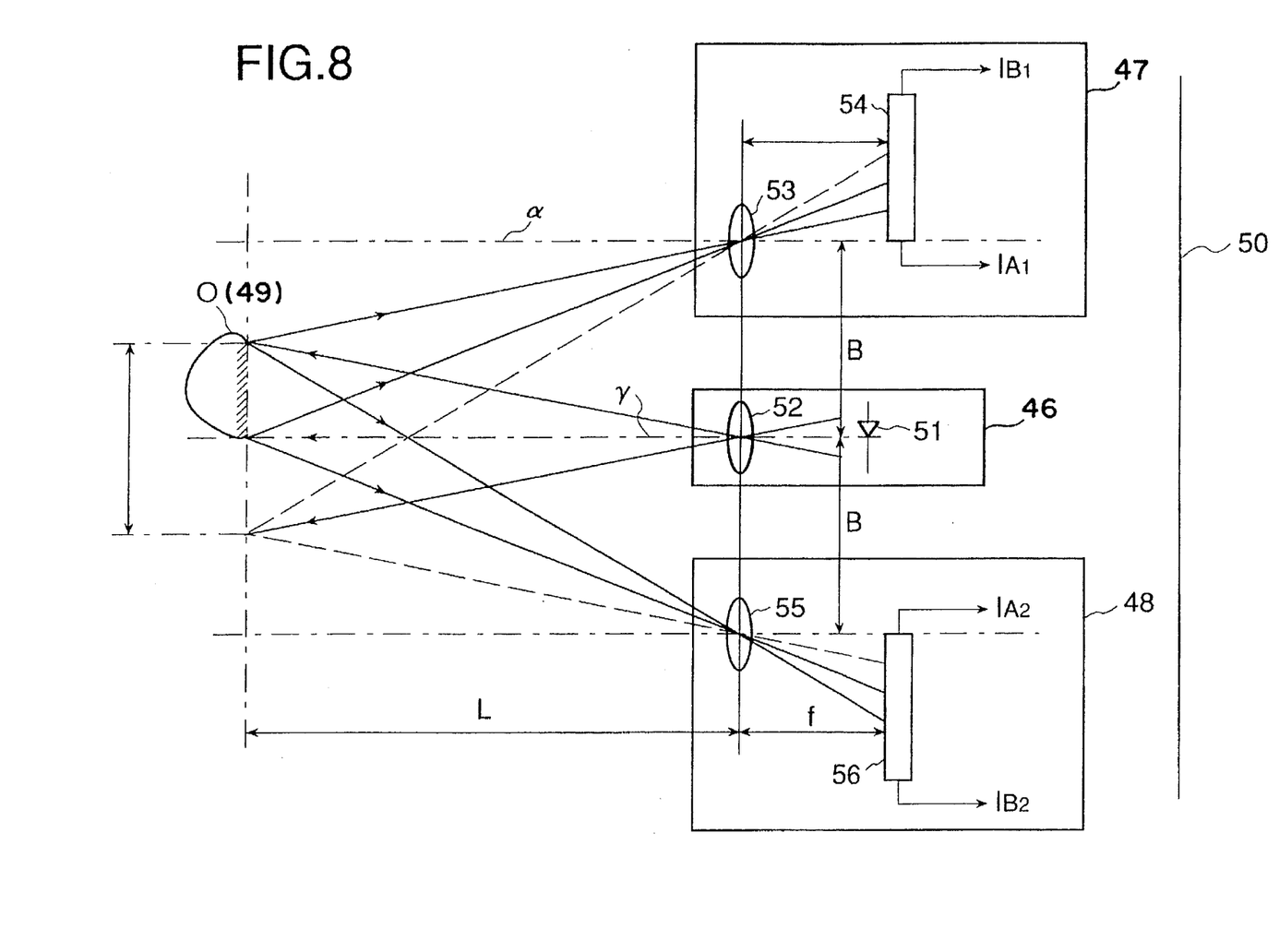
FIG. 8 is a view showing a conventional art of the auto focusing apparatus for the active-type camera.

This distance measuring apparatus is composed of a light projecting unit 46, a first photosensor unit 47 and a second photosensor unit 48 provided on both sides by sandwiching the light projecting unit 46, and a calculating unit (not shown). The light projecting unit 46, for projecting light of a specified wavelength to an object O (49), is composed of an infrared light-emitting diode 51 and a projecting lens 52. The first photosensor unit 47, for receiving the light projected from the light projecting unit 46 and reflected on the object 49 for forming a first light image on a light-receiving face, is composed of a first light-receiving lens 53 and a first position detecting photosensor element 54. The first light-receiving lens 53 is positioned parallel to a film plane 50, in such a manner that it is separated by a baseline distance B from the optical axis γ of the light projecting lens 52 and its optical axis α is parallel to the optical axis γ of the light projecting lens 52.

The second photosensor unit 48, for receiving the light, projected from the light projecting unit and reflected by the object O, at a position opposite to the first photosensor unit 47 with respect to the light projecting unit, for forming a second light image on a light-receiving face, is composed of a second light-receiving lens 55 and a second position detecting photosensor device 56, in a similar manner as in the first photosensor unit 47. The second light-receiving lens 55 is positioned symmetrical to the first light-receiving lens 53 with respect to the light projecting lens 52, and the second position detecting photosensor device 56 is similar to the first photosensor device 54.

By receiving the reflection light from the object O in a position as shown in FIG. 8, an optical image of the object, lacking a side thereof having a shorter object distance, is formed on the first position detecting photosensor device 54, while an optical image lacking a side thereof having a longer object distance, is formed on the second position detecting photosensor device 56.

If the light-receiving lenses 53, 55 are mutually identical in the lens characteristics (focal length etc.) and the first and second position detecting photosensor devices 54, 56 have the same photoelectric conversion characteristics, the photocurrent ratio of the first and second photosensor devices when the received optical images are not eclipsed can be represented as $I_{A1}/(I_{A1}+I_{B1})=I_{A2}/(I_{A2}+I_{B2})$, ($I_{A1}=I_{A2}$, $I_{B1}=I_{B2}$) based on the similarity of triangles, as the first and second photosensor units 47, 48 are positioned symmetrically with respect to the optical axis of the light projecting unit 46.

In determining the variation in the output of the first position detecting photosensor device 54 is represented by $(I_{A1}+m1)/(I_{A1}+m1+I_{B1}-m1)$, while that of the second position detecting photosensor device 56 is represented by $(I_{A2}-m2)/(I_{A2}-m2+I_{B2}+m2)$. In such state, the ratio of the summed photocurrents of both photosensor devices becomes $(I_{A1}+m1+I_{A2}-m2)/(I_{A1}+m1+I_{B1}-m1+I_{A2}-m2+I_{B2}+m2)=I_A/(I_A+I_B)$ (since m1=m2). The object distance L can be determined from this result, based on the known trigonometric processing.

However, the embodiment shown in FIG. 8, requiring the first and second light-receiving lenses in mutually symmetrical positions with respect to the light-projecting lens, necessitates a large space in the application to a camera or the like. Thus the camera itself inevitably becomes larger and is restricted in design in consideration of the limitation in the physical arrangement.

SUMMARY OF THE INVENTION

In consideration of the foregoing, an object of the present invention is to provide a distance measuring apparatus capable of correct distance measurement irrespective of the state of an object.

Another object of the present invention is to provide a distance measuring apparatus operable even in a case where the distance measuring light does not fall sufficiently on the object or in a case the object has a contrast.

Still another object of the present invention is to provide a compact distance measuring apparatus, suitable for incorporation in an optical equipment or the like.

Still another object of the present invention is to provide a distance measuring apparatus comprising light projecting means for projecting light of a specified wavelength for the object for distance measurement, first photosensor means for calculating distance information by a trigonometric method by receiving the light projected by said light projecting means and reflected by said object, second photosensor means for calculating an amount of shift of the center or gravity of the light amount, resulting from the eclipse of the light image projected by said light projecting means, and calculating means for obtaining the distance information by correcting the distance information calculated by said first photosensor means with the detection value obtained by said second photosensor means.

The above-mentioned configuration can prevent erroneous distance measurement resulting from the eclipse of the projected light image, as the distance information obtained by the first photosensor means is corrected by the amount of shift of the center of gravity of the light amount, resulting from the eclipse of the projected light image and obtained by the second photosensor means.

Still another object of the present invention is to provide a distance measuring apparatus in which the first photosensor means is provided with a predetermined baseline distance (namely, base length) to the light projecting means, and the second photosensor means is provided regarding the light projecting means as the fulcrum perpendicularly to the direction of the baseline of the first photosensor means.

In case where the distance measuring apparatus is incorporated for example in a camera, the above-mentioned configuration allows one to position the light projecting means and the first photosensor means in the direction of the baseline against the front face of the camera and to position the second photosensor means directly below said light projecting means, thereby avoiding increase in the dimension of the camera, also increasing the freedom of positioning of the light projecting system in the distance measuring apparatus, and reducing the restriction in camera designing.

DETAILED DESCRIPTION OF THE PREFERRED EMBODIMENTS

Figure 1:
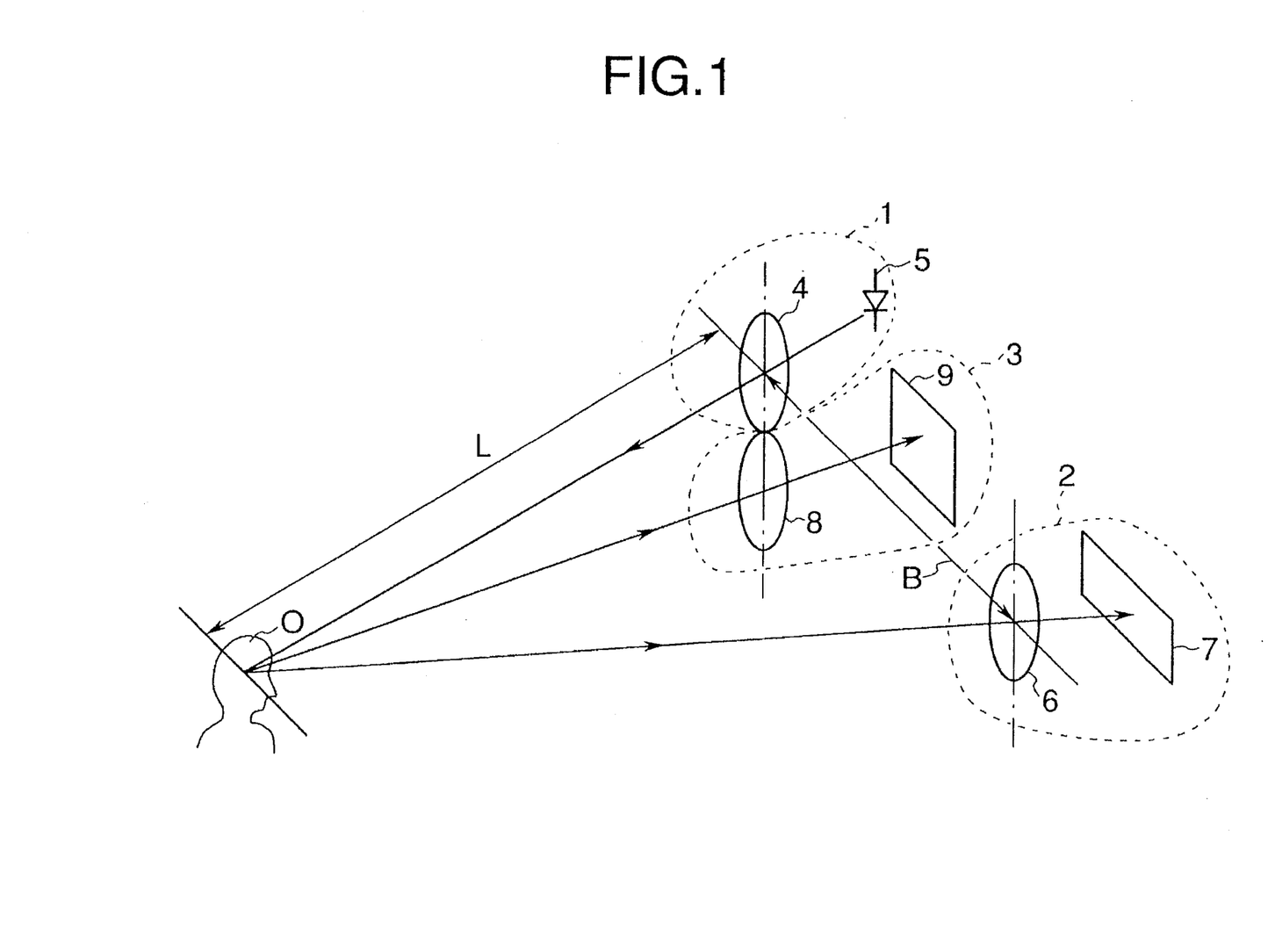
FIG. 1 is a schematic perspective view of an embodiment of the present invention.

FIG. 1 illustrates an embodiment of the distance measuring apparatus of the present invention.

The distance measuring apparatus of the present embodiment is composed of a light projecting unit 1, a first photosensor unit 2 distanced by a certain baseline distance B from the light projecting unit 1, a second photosensor unit 3 provided on a line passing the light projecting unit 1 and perpendicular to the direction of the baseline (i.e. provided below the light projecting unit), and an unrepresented processing unit. The light projecting unit 1 is provided for projecting the light of a specified wavelength toward an object O and is composed of an infrared light-emitting diode 5 and a light projecting lens 4. The second photosensor unit 3 may also be positioned above the light projecting unit 1.

The first photosensor unit 1, receiving the light projected from the light projecting unit 1 and reflected on the object O, forms a first received light image on a photo sensor face, thereby obtaining a distance information, and is composed of a first light-receiving lens 6 and a first photosensor device 7. The second photosensor unit 3, receiving the light projected from the light projecting unit 1 and reflected on the object O, forms a second received light image on a photosensor face, thereby obtaining the amount of eclipse of the projected light image, and is composed of a second light-receiving lens 8 and a second photosensor device 9. The photosensor devices 7, 9 are composed of PSD's (positive sensing devices), each providing an output corresponding to the position of incidence of the light.

Figure 2:
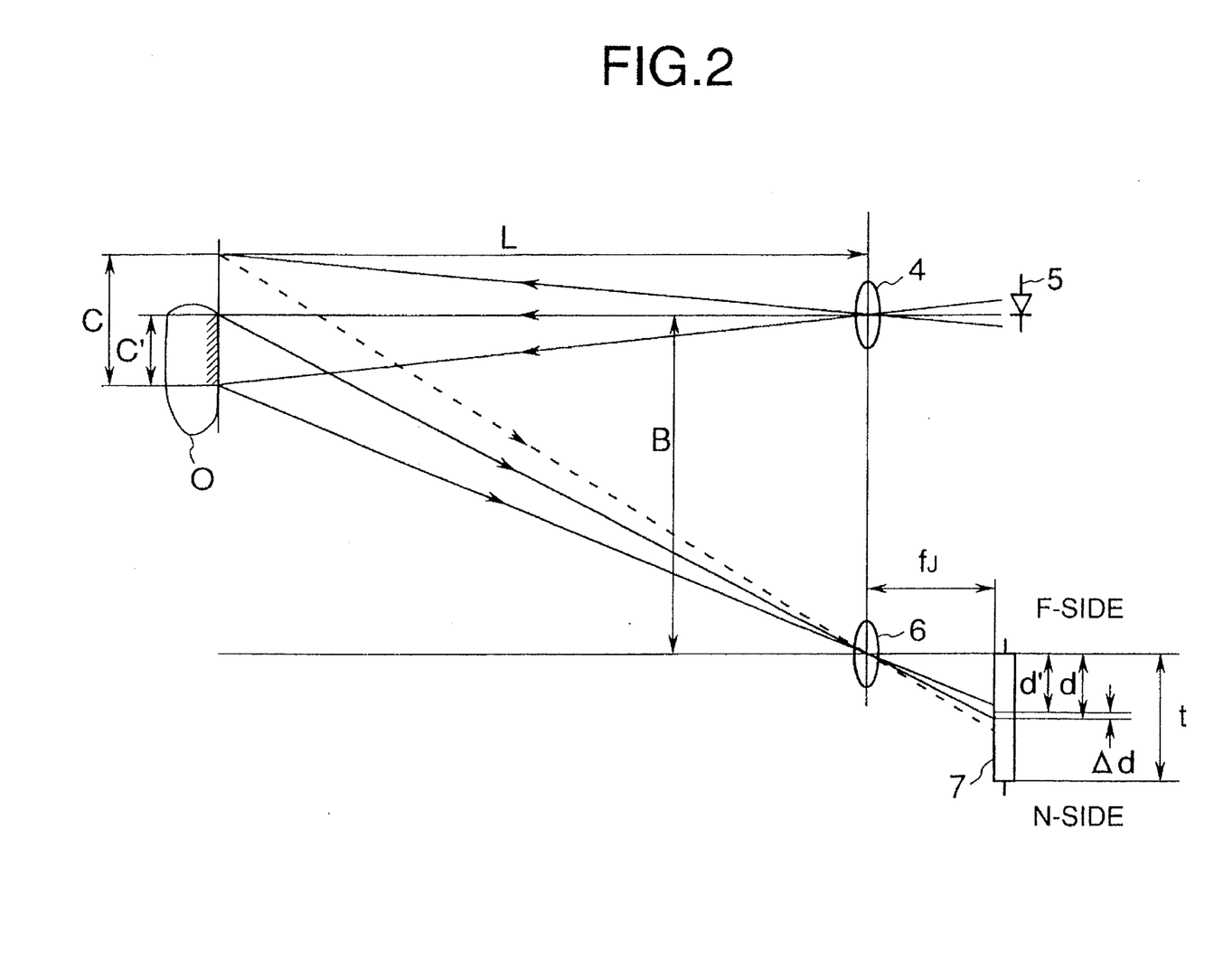
FIG. 2 is a plan view showing the arrangement of a first photosensor unit.

Now the first photosensor unit will be explained further with reference to FIG. 2. If the projected light of a width C falls on the object O only by a width C', the center of gravity of the light amount on the photosensor device 7 is shifted by $\Delta d$. In such state, the output $I_F$ of the photosensor device 7 at the F (far) side and the output $I_N$ at the N (near) side are represented by $I_F = I_T \cdot (t - d + \Delta d)/t$, $I_N = I_T \cdot (d - \Delta d)$ wherein $I_T = I_F + I_N$, so that the ratio of these outputs becomes $I_F/(I_F + I_N) = (t - d + \Delta d)/t$.

Figure 3:
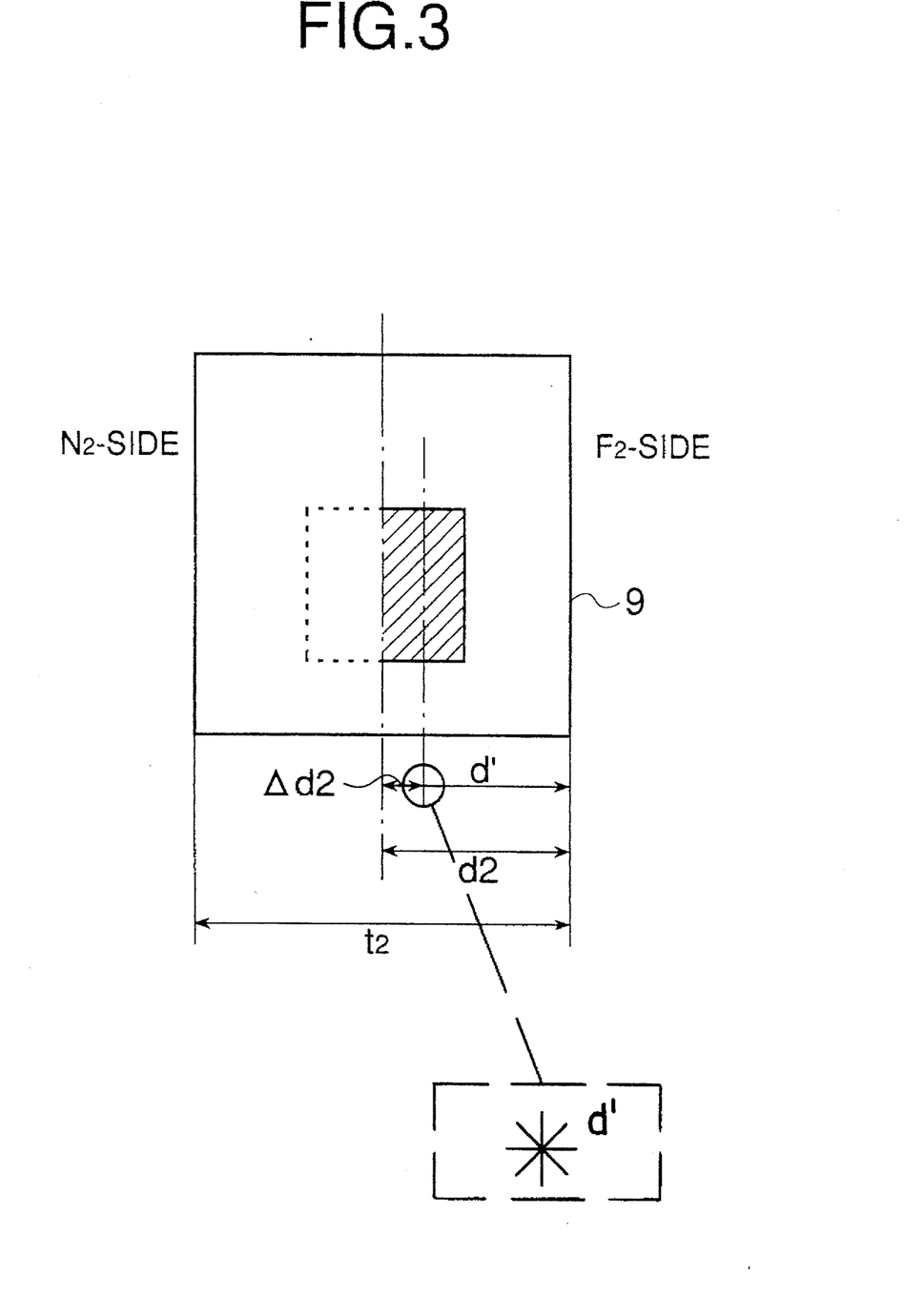
FIG. 3 is a plan view of a second photosensor unit.

Then the second photosensor unit will be explained with reference to FIG. 3. As the second photosensor device 9 has a zero baseline distance to the light projecting unit 1, the output current ratio does not vary even by the change in the object distance, but varies according to the amount $\Delta d_2$ of shift of the center of gravity of the light amount, resulting for example from the eclipse of the projected light image. Thus $\Delta d_2/t_2$ can be obtained by subtracting, from the output current ratio in a state without the eclipse of the projected light image, the actual output current ratio:

$$\Delta d_2/t_2 = \{(t_2 - d_2)/t_2\} - \{(t_2 - d')/t_2\} = I_{F2}/(I_{F2} + I_{N2}) - I_{F2}'/(I_{F2}' + I_{N2}')$$

If the first light-receiving lens 6 and the second light-receiving lens 8 are the same in the optical characteristics (focal length etc.), the error resulting from the eclipse of the projected light image can be corrected by adding, to an output obtained by multiplying the output current ratio of the first photosensor apparatus 7 with the effective length t thereof, an output obtained by multiplying the difference in the output current ratio of the second photosensor apparatus 9 with the effective length $t_2$ thereof.

In the following there will be given a more detailed description of the device of the present invention. In the following description, the shift of the center of gravity in the reflected spot image on the photosensor device is assumed to be caused by a contrast in the object, instead of a fact that a part of the distance measuring light does not fall on the object. Also it is assumed that the second photosensor unit is positioned above the light projecting unit.

Figure 4:
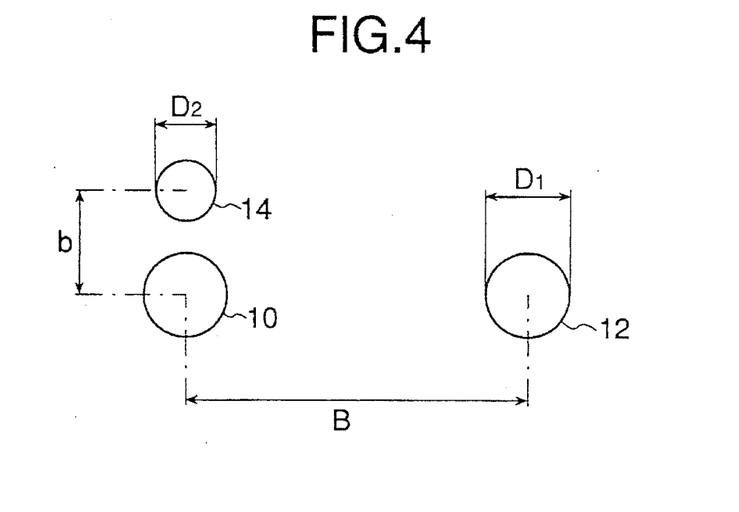
FIG. 4 is a view showing the arrangement of a light projecting lens and two light-receiving lenses.

FIG. 4 shows the arrangement of the light-projecting lens and the light-receiving lenses in an active-type distance measuring apparatus, seen from the front side of the camera.

There are shown a light-projecting lens 10, a light-receiving lens 12 for distance measurement with a diameter $D_1$, and a light-receiving lens 14 for contrast correction with a diameter $D_2$, wherein a relation:

$$D_1 > D_2 \qquad (1)$$

is satisfied for rendering the device compact.

The light-projecting lens 10 and the light-receiving lens 12 are mutually separated, between the optical axes thereof, by a baseline distance B, and the light-receiving lens 14 for contrast correction is provided in the vicinity of the light-projecting lens 10, in a direction perpendicular to that of the baseline B.

Figure 5:
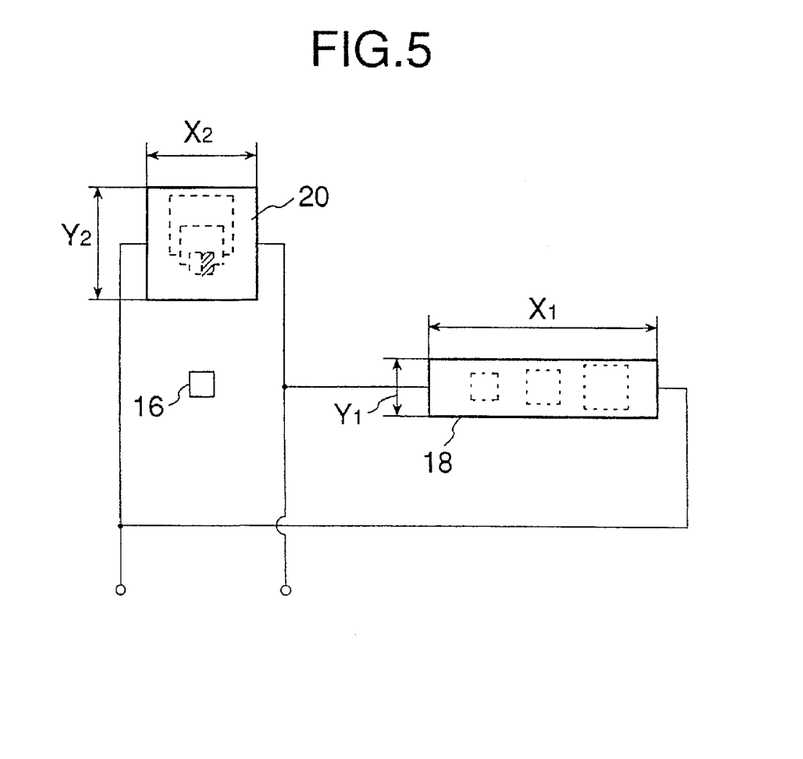
FIG. 5 is a view showing the arrangement of a light projecting device and two photosensor devices.

FIG. 5 illustrates an IRED (infrared emitting diode) constituting a light projecting device and provided on the focal plane of the above-mentioned light-projecting lens 10, and PSD's (position-detecting semiconductor devices) constituting photosensor elements.

There are shown a light-emitting area 16 of the IRED constituting the light-projecting device, a distance-measuring PSD 18 and a contrast-correcting PSD 20. It is assumed that the PSD 18 has a length $X_1$ and a width $Y_1$, and the PSD 20 has a length $X_2$ and a width $Y_2$.

As shown in FIG. 5, the IRED 16 and the distance-measuring PSD 18 are separated by the baseline length B, so that the reflected spot image of the IRED 16 on the PSD 18 moves in the direction of the baseline length, according to the object distance. Consequently the length $X_1$ of the PSD 18 has to be enough for covering such image movement amount.

On the other hand, the contrast-correcting PSD 20 and the IRED 16 are substantially not distanced in the direction of the baseline, so that the reflected spot image of the IRED 16 on the PSD 20 does not move in the direction of baseline, irrespective of the object distance. Consequently the lens $X_2$ of the PSD 20 needs only to cover the maximum width of the reflected spot image. Thus, there is satisfied a relation:

$$X_1 > X_2 \quad (2)$$

However, as the contrast-correcting PSD 20 is distanced by $L_2$ (cf. FIG. 4) from the IRED 16 in a direction perpendicular to the direction of the baseline, the reflected spot image of the IRED 16 on the PSD 20 moves in a direction perpendicular to that of the baseline, according to the object distance. Consequently the width $Y_2$ of the PSD 20 has to be enough for covering such movement amount.

On the other hand, the distance-measuring PSD 18 and the IRED 16 are substantially not distanced in the direction perpendicular to that of the baseline, so that the reflected spot image does not move in the direction perpendicular to that of the baseline. Consequently the width $Y_1$ of the PSD 18 has only to cover the maximum width of the reflected spot image or more. Thus there can be satisfied a relation:

$$Y_1 < Y_2 \quad (3)$$

The minimum value of $Y_2$ satisfying the above-mentioned relation (3) can be the minimum value covering the amount of movement of the reflected spot image corresponding to the object distance. As the distance b of optical axes between the light-projecting lens 10 and the light-receiving lens 14 between the optical axes there is sufficiently smaller than the baseline length B, $Y_2$ is sufficiently smaller than $X_1$.

From the foregoing considerations, the contrast-correcting PSD 20 can be sufficiently smaller than the distance-measuring PSD 18, and the distance measuring apparatus itself can be made smaller also in consideration of the compactization of the light-receiving lens 14.

Figure 6:
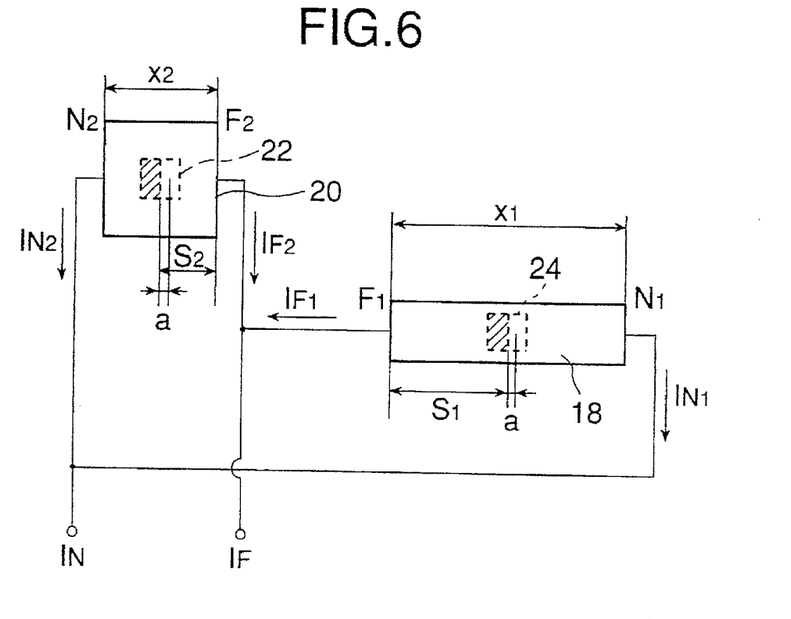
FIG. 6 is a view showing the method for correcting the influence resulting from the contrast of the object.

Now reference is made to FIG. 6, for explaining the principle of canceling contrast of the object. In FIG. 6, components same as those in FIG. 5 are represented by same numbers and will not be explained further.

In FIG. 6, there are shown a received spot image 22 on the contrast-correcting PSD 20, and a received spot image 24 on the distance-measuring PSD 18. Terminals of these PSD's 18, 20 are defined by $F_1$, $N_1$; and $F_2$, $N_2$, and the shift amounts of the centers of the received spot images 24, 22 from the terminals $F_1$, $F_2$ are respectively defined by $S_1$, $S_2$.

Now there is considered a situation where the object lacks contrast so that the received spot images have uniform luminance. The output currents $I_{F1}$, $I_{N1}$ respectively from the terminals $F_1$, $N_1$ of the PSD 18 are represented by:

$$I_{F1} = I_{T1} * (X_1 - S_1)/X_1 \quad (4)$$

$$I_{N2} = I_{T2} * S_1/X_1 \quad (5)$$

Wherein $I_{T1}$ indicates the total signal current represented by:

$$I_{T1} = I_{F1} + I_{N1} \quad (6)$$

Also the output currents $I_{F2}$, $I_{N2}$ respectively from the terminals $F_2$, $N_2$ of the PSD 20 are represented by:

$$I_{F2} = I_{T2} * (X_2 - S_2)/X_2 \quad (7)$$

$$I_{N2} = I_{T2} * S_2/X_2 \quad (8)$$

wherein $I_{T2}$ indicates the total signal current represented by $$I_{T2} = I_{F2} + I_{N2}$$

If the ratios of the total signal current to the lengths of the PSD's are so designed as to satisfy the following condition:

$$I_{T1}/X_1 = I_{T2}/X_2 = k \quad (9)$$

the sum $I_F$ of the output currents at the terminals $F_1$ and $F_2$ of the PSD's can be represented, from the foregoing relations (4), (7) and (9) as follows:

$$I_F = I_{F1} + I_{F2} \quad (10)$$
$$= k * (X_1 + X_2 - S_1 - S_2)$$

Also the sum $I_N$ of the output currents at the terminals $N_1$ and $N_2$ of the PSD's can be represented, from the foregoing relations (5), (8) and (10), as follows:

$$I_N = I_{N1} + I_{N2} \quad (11)$$
$$= k * (S_1 + S_2)$$

Then there will be considered a situation where the object has a contrast. In such situation, the center of gravity of the received spot image on each PSD is shifted by a in a same direction, as shown in FIG. 6, so that the output currents of the PSD's vary as follows:

$$I_{F1} = k*(X_1 - S_1 - a) \quad (12)$$

$$I_{N1} = k*(S_1 + a) \quad (13)$$

$$I_{F2} = k*(X_2 - S_2 + a) \quad (14)$$

$$I_{N2} = k*(S_2 - a) \quad (15)$$

Consequently the summed currents vary as follows:

$$I_F = I_{F1} + I_{F2} \quad (16)$$
$$= k * (X_1 + X_2 - S_1 - S_2)$$

$$I_N = I_{N1} + I_{N2} \quad (17)$$
$$= k * (S_1 + S_2)$$

As will be apparent from the foregoing, the relation (10) is same as (16), and (11) is same as (17). Stated differently, in the present configuration, the output currents from an object with contrast are same as those from an object without contrast. Thus the obtained signals are not dependent on the contrast of the object.

The output currents $I_F$ and $I_N$ are processed in a known signal processing circuit to obtain the distance information.

For satisfying the foregoing relation (9), as the total signal current is proportional to the aperture areas of the light-receiving lenses 12, 14, the light-receiving lens 12 and the PSD's 18, 20 should be so designed as to satisfy:

$$\sqrt{(D_1)}/X_1 = \sqrt{(D_2)}/X_2 = k \quad (18)$$

Figure 7:
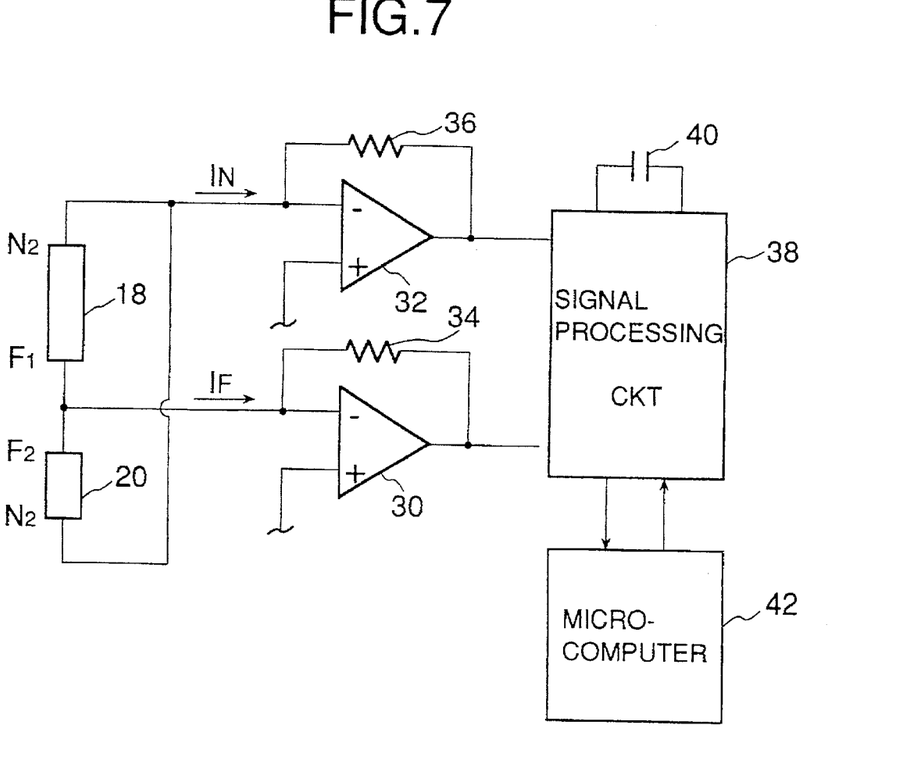
FIG. 7 is a block diagram showing the circuit configuration of an active-type distance measuring apparatus.

FIG. 7 is a block diagram of the circuit configuration of the distance measuring apparatus of the present embodiment.

There are provided operational amplifiers 30, 32 constituting current-voltage converting circuits, and feedback resistors 34, 36 connected to the negative feedback paths thereof. The aforementioned signal current $I_F$ and $I_N$ are respectively supplied to the operational amplifiers 30, 32, outputs of which are supplied to a signal processing circuit 38 for double integration, with a capacitor 40 therefor. A one-chip microcomputer 42 controls the signal processing circuit 38 and calculates the distance information by receiving the output thereof.

The configuration and function of the signal processing circuit 38 for double integration are already known and will not, therefore, be explained further.

The present invention has been explained by an application thereof to a camera such as a single-lens reflex camera, a lens shutter camera or a video camera, but it is not limited to such application and is likewise applicable to other optical equipment such as a binocular.

As explained in the foregoing, in addition to the distance-measuring first optical system positioned with the specified baseline length to the light projecting system and including the first photosensor device and the first light-receiving lens, the correcting second optical system including the second photosensor device and the second light-receiving lens is provided in the vicinity of said light projecting system in a direction perpendicular to that of said baseline.

Consequently the device of the present invention can be made smaller and can achieve highly precise distance measurement even for an object having contrast or an object on which the distance measuring light only partly falls.

Also in the foregoing embodiment, there are satisfied relations:

$$X_1 > X_2$$
$$Y_1 < Y_2$$

wherein $X_1$ and $Y_2$ are dimensions of the first photosensor device respectively in the direction of the baseline and in a direction perpendicular thereto, and $X_2$ and $Y_2$ are dimensions of the second photosensor device respectively in the direction of the baseline and in a direction perpendicular thereto. There are further satisfied a relation:

$$X_1 > Y_2$$

wherein $X_1$ and $Y_2$ have the same meaning as above, also a relation of selecting the effective aperture area of the second light-receiving lens smaller than that of the first light-receiving lens, and a relation:

$$\sqrt{(D_1)}/X_1 = \sqrt{(D_2)}/X_2$$

wherein $D_1$ and $D_2$ are respectively the effective diameters of the first and second light-receiving lenses.

These relations allow further rendering the distance measuring apparatus compact.

What is claimed is:

1. A distance measuring apparatus comprising:

light projecting means for projecting distance measuring light to an object;

first photosensor means disposed at a predetermined baseline length from said light projecting means;

second photosensor means disposed in a direction from said light projecting means crossing the direction of said baseline; and signal forming means for correcting the output of said first photosensor means by using the output of said second photosensor means and forming a signal for indicating a distance from said device to said object, utilizing the corrected output.

2. A distance measuring apparatus according to claim 1, wherein said first and second photosensor means respectively includes a light receiving lens and a photosensor device.

3. A distance measuring apparatus according to claim 2, wherein said photosensor device is a device capable of providing an output relating to an incident position of a reflected spot image.

4. A distance measuring apparatus according to claim 1, wherein said distance measuring light is an infrared light.

5. A distance measuring apparatus according to claim 1, wherein said second photosensor means is provided in a direction from said light projecting means, perpendicular to the direction of said baseline.

6. A distance measuring apparatus comprising:

light projecting means including a light source and a light projecting lens;

first photosensor means including a first light receiving lens provided at a position separated by a predetermined baseline length from said light projecting lens and a first photosensor device for providing information to be used for distance measurement; and second photosensor means including a second light receiving lens provided in a direction from said light projecting lens, perpendicular to the direction of said baseline, and a second photosensor device, and adapted to provide correcting information.

7. A distance measuring apparatus according to claim 6, satisfying relations:

$$X_1 > X_2 \text{ and}$$
$$Y_1 < Y_2$$

wherein $X_1$ and $Y_1$ are dimensions of said first photosensor device respectively in the direction of said baseline and in a direction perpendicular thereto, and $X_2$ and $Y_2$ are dimensions of said second photosensor device respectively in the direction of said baseline and in a direction perpendicular thereto.

8. A distance measuring apparatus according to claim 6, satisfying relations:

$$X_1 > Y_2$$

wherein $X_1$ is the dimension of said first photosensor device in the direction of said baseline, and $Y_2$ is the dimension of said second photosensor device in a direction perpendicular to the direction of said baseline.

9. A distance measuring apparatus according to claim 6, wherein an effective aperture area of said second light receiving lens is smaller than that of said first light receiving lens.

10. A distance measuring apparatus according to claim 6, satisfying a relation:

$$\sqrt{(D_1)}/X_1 = \sqrt{(D_2)}/X_2$$

wherein $D_1$ and $D_2$ are respectively effective diameters of said first and second light receiving lenses.

11. A distance measuring apparatus comprising:

light projecting means for projecting distance measuring light to an object;

first photosensor means for providing output signals indicative of projected light incident thereon;

second photosensor means for providing output signals indicative of projected light incident thereon; and circuit means for processing said output signals of said first and second photosensor means and providing an output signal for use in indicating distance to said object, said first and second photosensor means being so disposed with respect to said light projecting means that said circuit means provides the same output signal irrespective of whether said object has contrast or lacks contrast.

* * * * *

UNITED STATES PATENT AND TRADEMARK OFFICE
CERTIFICATE OF CORRECTION

PATENT NO. : 5,668,626
DATED : September 16, 1997
INVENTOR(S) : Shin et al.

It is certified that error appears in the above-identified patent and that said Letters Patent is hereby corrected as shown below:

Col. 3, line 24, after "apparatus;" insert -- and --.

Col. 5, line 51, delete "$I_{N_2}-I_{T_2}$" and insert -- $I_{N1} = I_{T1}$ --.

Signed and Sealed this

Tenth Day of March, 1998

Attest:

BRUCE LEHMAN

Attesting Officer    Commissioner of Patents and Trademarks